April 25, 1967 M. J. PAWL 3,315,925
HOLDER FOR GREENS
Filed April 5, 1965
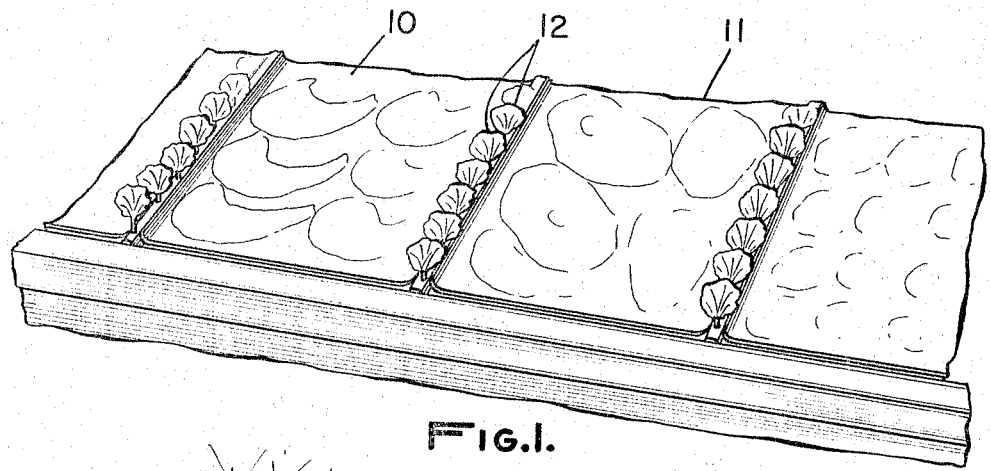
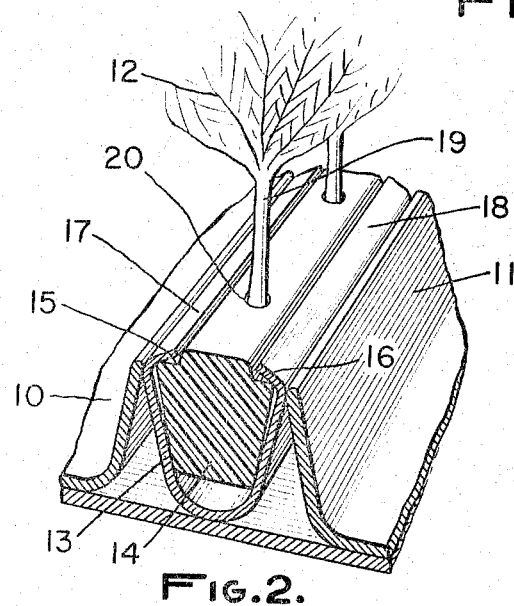
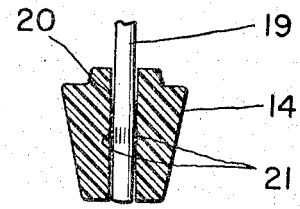
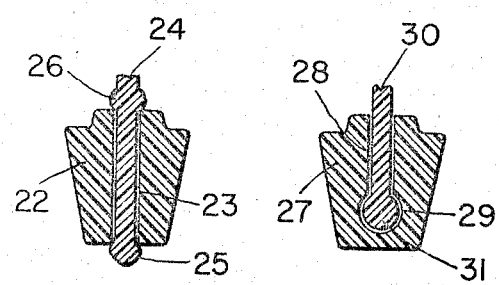
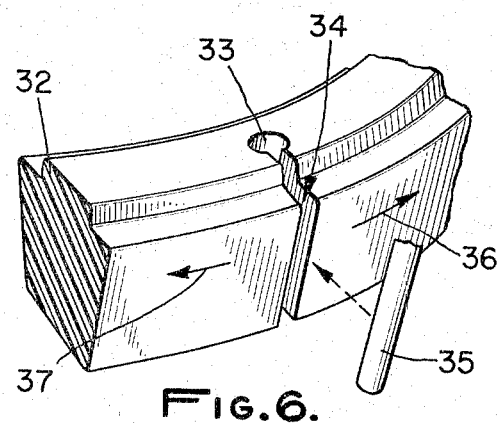
INVENTOR.
MICHAEL J. PAWL
BY
Elliott & Pastoriza
ATTORNEYS

United States Patent Office 3,315,925
Patented Apr. 25, 1967

3,315,925
HOLDER FOR GREENS
Michael J. Pawl, La Habra, Calif., assignor to Market Decorators, Inc., a corporation of California
Filed Apr. 5, 1965, Ser. No. 445,544
3 Claims. (Cl. 248—27.8)

This invention relates to improved holders for greens and more particularly to holders for artificial greens of the type used for decorative effects in markets such as in the areas where meats and similar foods are on display.

It is common practice in food markets to provide greens or similar foliage either in the form of parsley or artificial leaves along the borders of compartments in which meats or similar foods are displayed.

In the case of artificial greens, it would be desirable to provide a holding means so designed that a plurality of the greens aligned in a row may be very easily positioned or removed from the marginal areas of the display compartments.

With the foregoing in mind, it is a primary object of this invention to provide an improved holding means for greens and particularly for artificial greens for decorative display purposes.

More particular objects of this invention are to provide a holder for artificial type greens in which the greens may be permanently secured in the holder or, alternatively, secured in such a manner that they may be manually removed and the holder used for other greens.

Briefly, these and other objects and advantages of this invention are attained by providing a holder in the form of an elongated member formed of a resilient plastic or rubber material and provided with a plurality of openings on its top surface. These openings extend downwardly into the member and are arranged to receive the stems of artificial greens in order to support the same in a uniform row.

In accordance with certain embodiments of the invention, the openings in the elongated member are designed to cooperate with the stems of the greens in such a manner that the greens may be secured within the openings or removed as desired, without damaging the holder.

A better understanding of the invention will be had by now referring to the accompanying drawings, in which:

FIGURE 1 is a fragmentary perspective view of a food counter incorporating a decorative display of greens supported by a holding means in accordance with the present invention;

FIGURE 2 is an enlarged fragmentary perspective view partly in cross-section of the holder for the greens;

FIGURE 3 is a cross-section of the holding member itself showing a first species of the invention;

FIGURE 4 is a cross-section of a holder illustrating a second species of the invention;

FIGURE 5 is a cross-section of a holder illustrating a third species of the invention; and, FIGURE 6 is a fragmentary perspective view illustrating a fourth species of the invention.

Referring first to FIGURE 1, there are shown display compartments 10 and 11 such as for meats and the like as would exist in a food market. Along the borders of the display compartments there are provided rows of greens such as indicated at 12.

With particular reference to FIGURE 2, there is normally provided an elongated strip 13 which is conventional in the art and serves to support artificial greens of the rubber type such as shown and described in United States Patent 2,739,402, issued March 27, 1956 and entitled Rubber Greens.

In accord with the present invention, the same elongated type metal strip 13 may be used for supporting an elongated flexible member 14. The member 14 is provided with upper recessed side edges to define elongated shoulders such as indicated at 15 and 16 for receiving the upper edge portions of the strip 13 as at 17 and 18. The member 14 is thus secured within the strip in a desired position.

The member 14 is arranged to receive the stems of artificial greens, such as the stem 19, within a plurality of openings along the top surface of the member, such as the opening 20.

Referring now to FIGURE 3, there is shown a first species of the invention wherein it will be noted that the opening 20 extends entirely into and through the member 14. In this particular embodiment, which may also be considered the embodiment of FIGURE 2, the stem 19 is received within the opening 20 and fused to the inside surfaces of the opening as at 21 by a heating process. The member 14 and stem 19 are of fusable material such as rubber or plastic so that the stem 19 in this particular arrangement is permanently secured to the elongated member 14.

FIGURE 4 shows another species of the invention wherein there is provided an elongated member 22 provided with an opening 23 extending entirely through the member. In this case, the stem, illustrated at 24 for the artificial green, includes an end enlargement 25 and an intermediate enlargement 26. The spacing between the enlargements 25 and 26 corresponds substantially to the length of the opening 23.

To secure the stem illustrated in FIGURE 4, the lower enlarged end 25 is urged down through the opening 23 to resiliently expand the opening until the enlarged end 25 protrudes from the bottom of the member 22. At this point, the opening will collapse about the portion of the stem intermediate the enlargements 25 and 26 so that the stem 24 is secured to the member 22.

FIGURE 5 illustrates another means for securing a stem to the member. In FIGURE 5 there is shown an elongated member 27 having an opening 28 which terminates in an enlarged area 29 within the member 27. The stem, such as stem 30 for one of the greens, in turn is provided with an enlargement 31 at its lower end, which enlargement is adapted to be received within the enlarged area 29 so that the stem 30 is locked within the opening.

In the embodiment of FIGURE, 6 there is provided an elongated member 32 having openings such as the opening 33 in its top surface as characterizes the other embodiments of the invention. However, in the embodiment of FIGURE 6 there is provided a lateral slot 34 intersecting the opening 33 and extending out one side of the member 32.

With the foregoing arrangement, a stem 35 may be inserted sidewise into the member 32 by bowing the member to cause the one side to assume a convex curve. Thus, the warping of the member 32 will result in a widening of the slot 34 as indicated by the arrows 36 and 37. With the slot widened, the stem 35 may then be inserted into the opening 33. When the warping pressure is relieved so that the bowing is eliminated, the opening 33 will grip the stem 35 and retain the same in place.

In the species of FIGURES 4, 5, and 6 it is possible for a person to manually insert and remove the green stems within the holder. Thus, different types of greens may be readily supported and other greens easily substituted therefor as desired. Accordingly, the same elongated member such as shown at 22 in FIGURE 4, 27 in FIGURE 5, and 32 in FIGURE 6 may be used.

In the embodiment of FIGURES 2 and 3 wherein the stem is fused into the member, the member together with the greens constitute essentially an integral structure which may be of a length corresponding to the length of the border areas of a food display counter.

From the foregoing description, it will be evident that the present invention has provided an improved holder for greens wherein the various objects and advantages set forth heretofore are fully realized.

What is claimed is:

1. A holder for supporting a plurality of greens by their stems in a row for decorative display, including: an elongated flexible member having upper recessed edges defining longitudinally running shoulders; and an elongated strip retainer of general U shape in cross-section for receiving said member, the upper edges of said strip retainer defining the upper ends of the arms of said U shape turning inwardly to engage said longitudinally running shoulders so that said flexible member is supported by said strip retainer, the top surface of said member including a plurality of stem receiving openings spaced successively therealong, intermediate said shoulders and extending down into said member, said openings defining holding means for cooperation with said stems to hold said stems in said openings.

2. A holder according to claim 1, in which each of said openings terminates in an enlarged area at its inner end within said member to define said holding means.

3. A holder for supporting a plurality of greens by their stems in a row for decorative display, including: an elongated flexible member having upper recessed edges defining longitudinally running shoulders for receiving thereover the upper edges of a strip retainer, the top surface of said member including a plurality of stem receiving openings spaced successively therealong intermediate said shoulders and extending down into said member, each of said openings being laterally intersected by a side slot extending to and opening out one side of said member whereby bowing of said member to warp said one side into a convex surface expands the width of said side slot so that one of said stems may be inserted from the side into said opening, relaxing of pressure on said member so that the bow is eliminated resulting in the opening gripping the stem to retain the same in said member.

References Cited by the Examiner

UNITED STATES PATENTS

| | | | |
|---|---|---|---|
| 2,062,577 | 12/1936 | Kaplan | 248—27.8 |
| 2,317,080 | 4/1943 | Phillips | 248—346.1 |
| 2,453,906 | 11/1948 | Hamlet | 47—41.11 |
| 2,747,333 | 5/1956 | Erbguth | 47—41.13 |
| 2,837,855 | 6/1958 | Hoke | 47—41.11 X |
| 2,900,760 | 8/1959 | Tupper | 47—41.11 |

CLAUDE A. LE ROY, *Primary Examiner.*

JOHN PETO, *Examiner.*